United States Patent Office 3,179,667
Patented Apr. 20, 1965

3,179,667
PROCESS FOR MAKING OXAZOLIDINONES
Wilhelm E. Walles, Midland, Mich., assignor to The Dow Chemical Company, Midland, Mich., a corporation of Delaware
No Drawing. Filed Apr. 25, 1963, Ser. No. 275,518
9 Claims. (Cl. 260—307)

This invention relates to methods for making 2-oxazolidinone and its 5-substituted homologs and analog.

It is known to make oxazolidinones by the reaction of an alkylene oxide with molten urea at temperatures of 135–180° C. to produce an intermediate adduct and then raising the temperature to 190–210° C. to cyclize the intermediate [Tousignant and Baker, J. Org. Chem., 22, 166 (1957)]. The yields are low, however.

According to the present invention, oxazolidinones are readily made in high yields by means of a two-step process:

(1) Urea is dissolved in an oxazolidinone, preferably the one to be produced, and then reacted with the appropriate vicinal alkylene oxide, the reaction being conducted at a temperature below 140° C., and preferably at about 110–130° C.

(2) The intermediate produced in Step (1), after removal of any unreacted alkylene oxide, is heated at 160–200° C. to cyclize the intermediate and thus produce the oxazolidinone.

While the above two steps can be carried out consecutively in a single reactor, it is preferred to conduct the second step in a separate reactor so designed that the material being processed is very quickly heated to the reaction temperature and the product is quickly removed from the reaction zone and cooled, since it may react further, especially in the presence of ammonia and other by-products and extraneous materials.

The use of the oxazolidinone as the reaction solvent in Step (1) has several beneficial aspects:

(a) It enables the liquefication and reaction of the urea at a temperature below its melting point (132° C.), higher temperatures being known to cause decomposition of urea.

(b) It stabilizes and activates the urea, thus minimizing thermal decomposition even at higher temperatures up to about 150° C.

The reactions of the process can be summarized as follows:

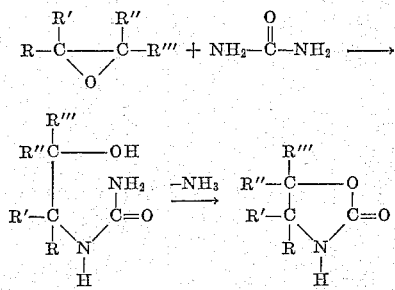

wherein R, R', R", and R''' are each H or an alkyl radical.

Illustrative alkylene oxides and the corresponding oxazolidinones obtainable therefrom are shown in Table I.

TABLE I

| Alkylene Oxide | Oxazolidinone |
|---|---|
| Ethylene | Unsubstituted. |
| 1,2-Propylene | 5-Methyl-. |
| 1,2-Butylene | 5-Ethyl-. |
| 1,2-Hexylene | 5-Butyl-. |
| 1,2-Octylene | 5-Hexyl-. |
| 2,3-Butylene | 4,5-Dimethyl-. |
| Isobutylene | 5,5-Dimethyl-. |
| 2,3-Amylene | 4-Methyl-5-Ethyl-. |
| 2-Ethyl-1-Hexene | 5-Ethyl-5-Butyl-. |
| 2-Methyl-3,4-hexene | 4-Ethyl-5-isopropyl-. |
| Tetramethylethylene | 4,4,5,5,-Tetramethyl-. |
| 2-Methyl-2,3-butylene | 4,5,5-Trimethyl-. |

The preferred oxides are the 1,2-alkylene oxides. These are useful to make the corresponding 5-alkyloxazolidinones.

In carrying out the process of the invention, one mole of urea is dissolved in about 0.5 to 5 times its weight of the oxazolidinone to be used as the reaction solvent, preferably the same as the one to be made, the solution is warmed to about 100–140° C., preferably about 110–130° C., and 1 mole of the alkylene oxide is then added. Heating is continued until most of the urea has reacted, usually about 2–3 hours, after which the reactor is cooled and any unreacted alkylene oxide is removed, suitably by warming under vacuum. The thus formed intermediate, hydroxyalkylurea, may be further purified, as by distillation or crystallization, or it may be further reacted as is to produce the oxazolidinone.

The cyclization step is best carried out by continuously passing the intermediate into a reaction zone maintained at a temperature of about 160–200° C. and continuously flashing from said zone the thus formed oxazolidinone. Alternatively, the residue left after devolatilizing the intermediate can be left in the same reactor and heated to cyclization temperature for a time sufficient to effect cyclization, usually from a few minutes to 5 hours or more, depending on the temperature and the particular materials being processed. This batch process usually produces lower yields of oxazolidinone than does the continuous one.

The practice of the invention is illustrated by the following examples.

Example 1

STEP 1.—REACTION OF PROPYLENE OXIDE WITH UREA

A 10-gallon nickel reactor was charged with 25.25 lbs. of 5-methyl-2-oxazolidinone and heated to 100° C. Then 15.00 lbs. of urea were added, thus forming a clear solution. Air was removed by evacuating the reactor and refilling with nitrogen three times. The temperature was then raised to 125° C. and 14.50 lbs. of propylene oxide was added gradually over a period of 3 hours. Stirring and heating were continued for an additional 2 hours at 125°, at the end of which time the pressure had dropped from the maximum of 38 p.s.i. to 21 p.s.i.

Unreacted propylene oxide was removed by cooling the reactor to 20°, reducing the pressure to 200 mm. absolute, and then gradually warming to 100° while maintaining the vacuum. The product thus obtained was a clear colorless, viscous liquid. Yield 54.1 lbs., 98% of theory. Infrared analysis showed that the product was essentially a solution of isopropanolurea in 5-methyl-oxazolidinone.

STEP 2.—RING CLOSURE

A glass distillation flask fitted with a dropping funnel and downward condenser was maintained at 170° C. and 5 mm. pressure as 160 g. of the product of Step 1 was added dropwise over a period of 1.5 hours. The product consisted of 149 g. of liquid analyzing 89.9% 5-methyloxazolidinone and 10.1% 2-hydroxypropylurea. Seven grams of resin remained in the still. This amounts to a conversion to oxazolidinone of 81% and a yield of 90% in the two-step process.

When the ring closure step was conducted batchwise by heating the product of Step 1 at 180° C. for 2 hours and then fractionally distilling the product at 165° over an 8-hour period, a larger residue of polymer and a lower yield of 5-methyloxazolidinone was obtained.

In Step 2 of the present process, the addition of up to about 2% by weight of alkali metal hydroxide significantly increases the yield of oxazolidinone and correspondingly decreases the amount of polymer formed. A further advantage is that the polymer thus formed is water-soluble, and thus is easily removed from the equipment. This is illustrated by experiments in which 0, 1% and 2%, by weight, of NaOH were added to the material being used in Step 2 of the process of the invention. The percentages of polymer formed in the ring closure step were 8.0, 5.5 and 7.0, respectively.

Results similar to those described above are obtained when other alkylene oxides are reacted with urea and the product then cyclized as set forth herein.

I claim:

1. The process for making a 2-hydroxyalkyl urea comprising reacting by contacting a solution of urea in an oxazolidinone with a vicinal alkylene oxide at a temperature of about 100–140° C.

2. The process of claim 1 wherein the temperature is about 110–130° C.

3. The process for making 2-hydroxypropyl urea comprising reacting by contacting urea with 1,2-propylene oxide, the reaction being conducted at a temperature of about 100–140° C. and in a liquid medium consisting essentially of 5-methyl-2-oxazolidinone.

4. The process for making an oxazolidinone having the formula

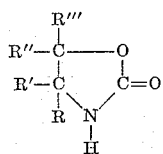

comprising (1) reacting by contacting a solution of urea in said oxazolidinone at a temperature of about 100–140° C. with a molar equivalent of an alkylene oxide having the formula

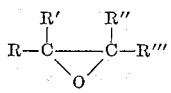

where, in the above formulas, R, R', R" and R'" each represent a radical selected from the group consisting of H and alkyl radicals, and (2) cyclizing the intermediate formed in Step (1) by heating it at about 160–200° C., and in the presence of a catalytic amount of up to about 2 percent by weight, based on the solution of intermediate, of alkali metal hydroxide, thus to form the oxazolidinone.

5. The process of claim 4 wherein the alkylene oxide is propylene oxide.

6. The process for making 5-methyl-2-oxazolidinone comprising (1) reacting by contacting a solution of urea in 5-methyl-2-oxazolidinone with a molar equivalent of 1,2-propylene oxide at a temperature of about 100–140° C. and then (2) heating the resultant intermediate solution at about 160–200° C. and in the presence of a catalytic amount of up to about 2 percent by weight, based on the solution of intermediate, of alkali metal hydroxide for a time sufficient to convert a significant portion of said intermediate to 5-methyl-2-oxazolidinone.

7. The process of claim 6 wherein Step (2) is conducted as a continuous flash distillation.

8. The process for cyclizing a 2-hydroxyalkyl urea to the corresponding 2-oxazolidinone comprising continuously passing a solution of said urea in said oxazolidinone through a reaction zone maintained at a temperature of about 160–200° C. and in the presence of a catalytic amount of up to about 2 percent by weight, based on the solution of intermediate, of alkali metal hydroxide and a pressure such that the oxazolidinone is vaporized.

9. The method for making 5-methyl-2-oxazolidinone comprising (1) reacting by contacting a solution of urea in 5-methyl-2-oxazolidinone with a molar equivalent of 1,2-propylene oxide, thus to form an intermediate solution, adding to said intermediate solution about 1% by weight of NaOH and (3) continuously passing the solution through a reaction zone maintained at about 170° C. and 5 mm. pressure.

References Cited by the Examiner

Tousignant et al.: J. Org. Chem., vol. 22, pages 166–8 (1957).

Close: J. Am. Chem. Soc., vol. 73, pages 95–98 (1951).

IRVING MARCUS, *Primary Examiner.*

NICHOLAS S. RIZZO, *Examiner.*